United States Patent Office 3,486,010
Patented Dec. 23, 1969

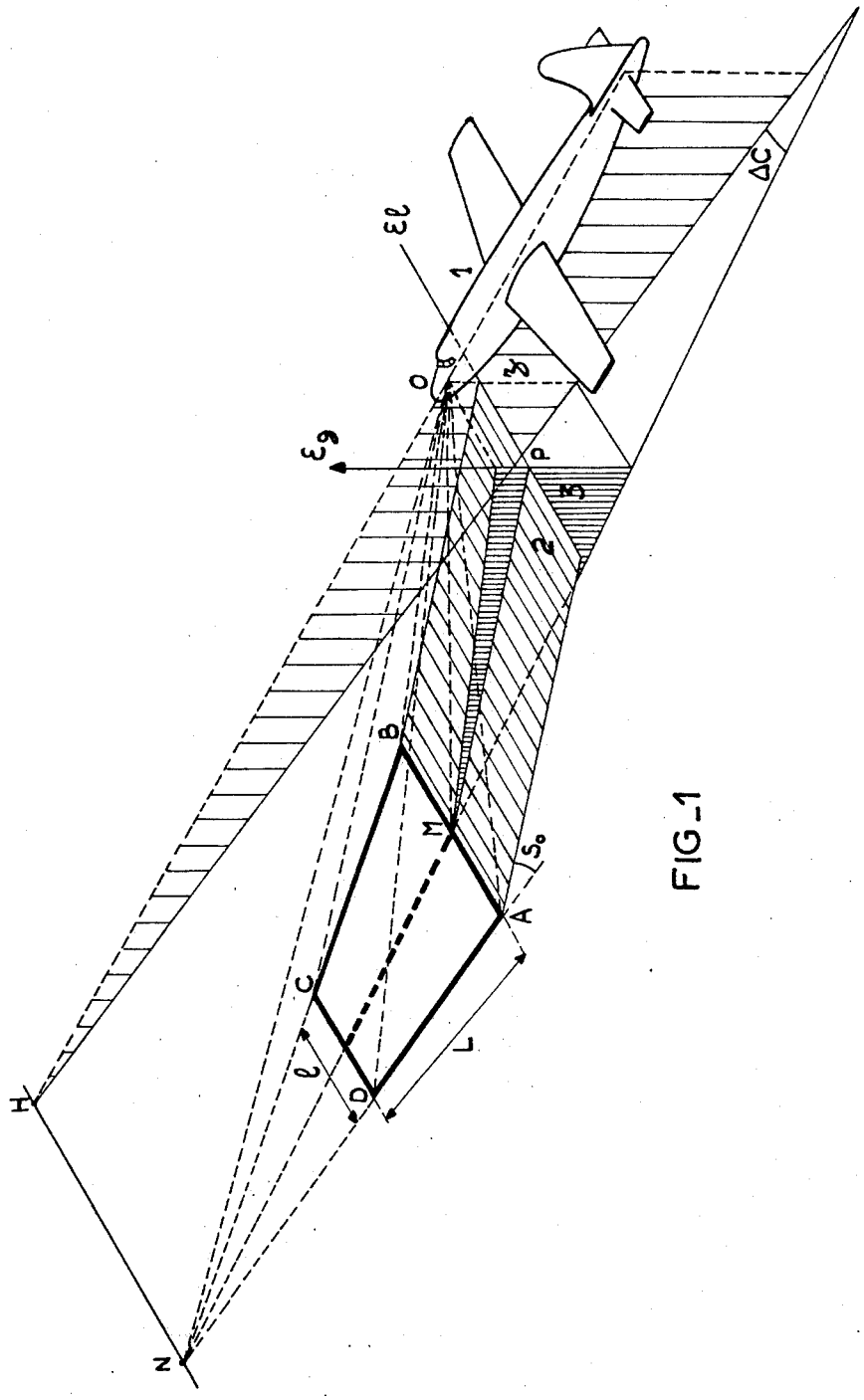
FIG_1

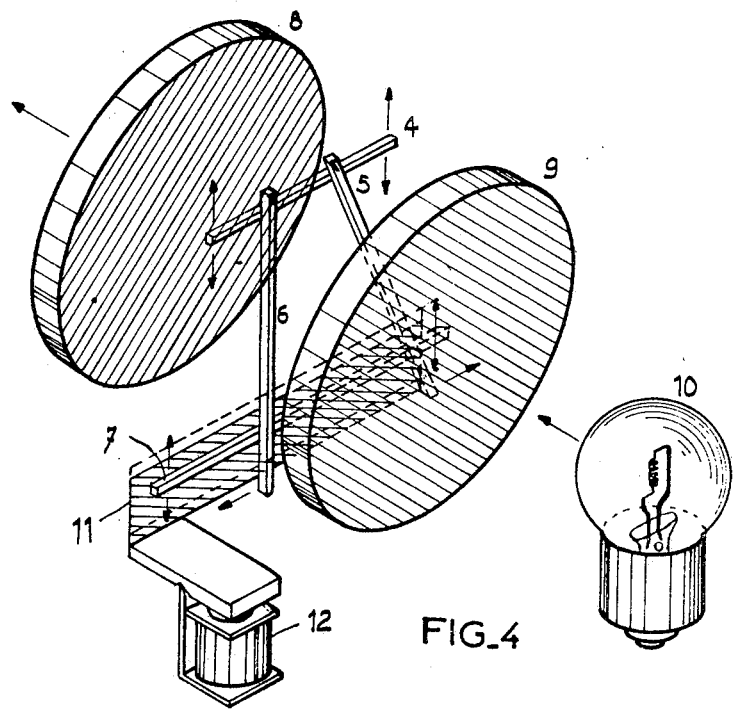
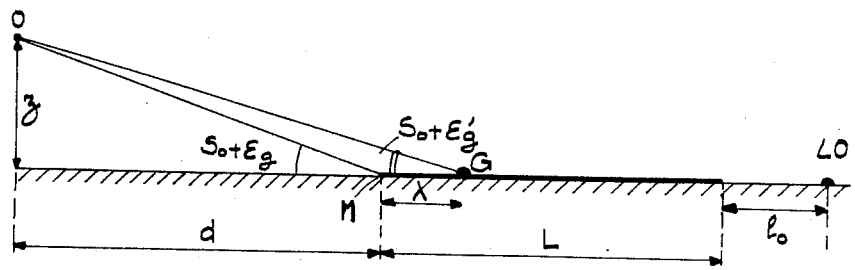
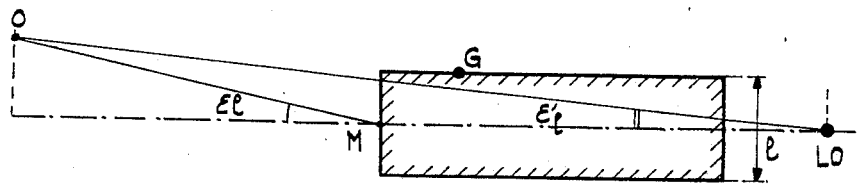
FIG _ 5

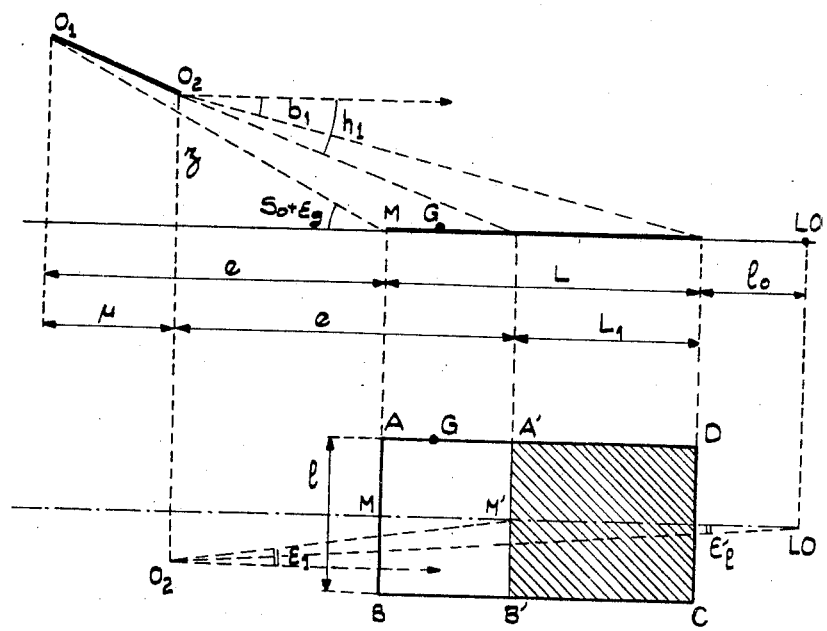
FIG_6
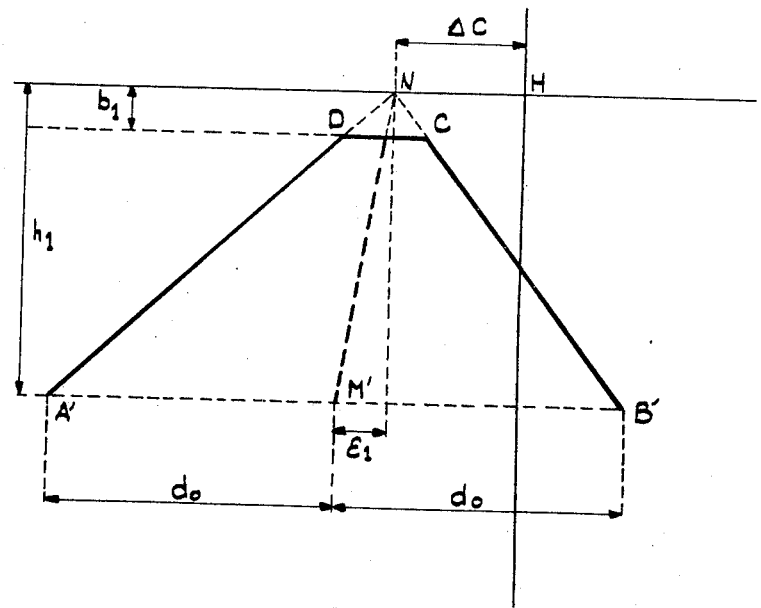
FIG_7

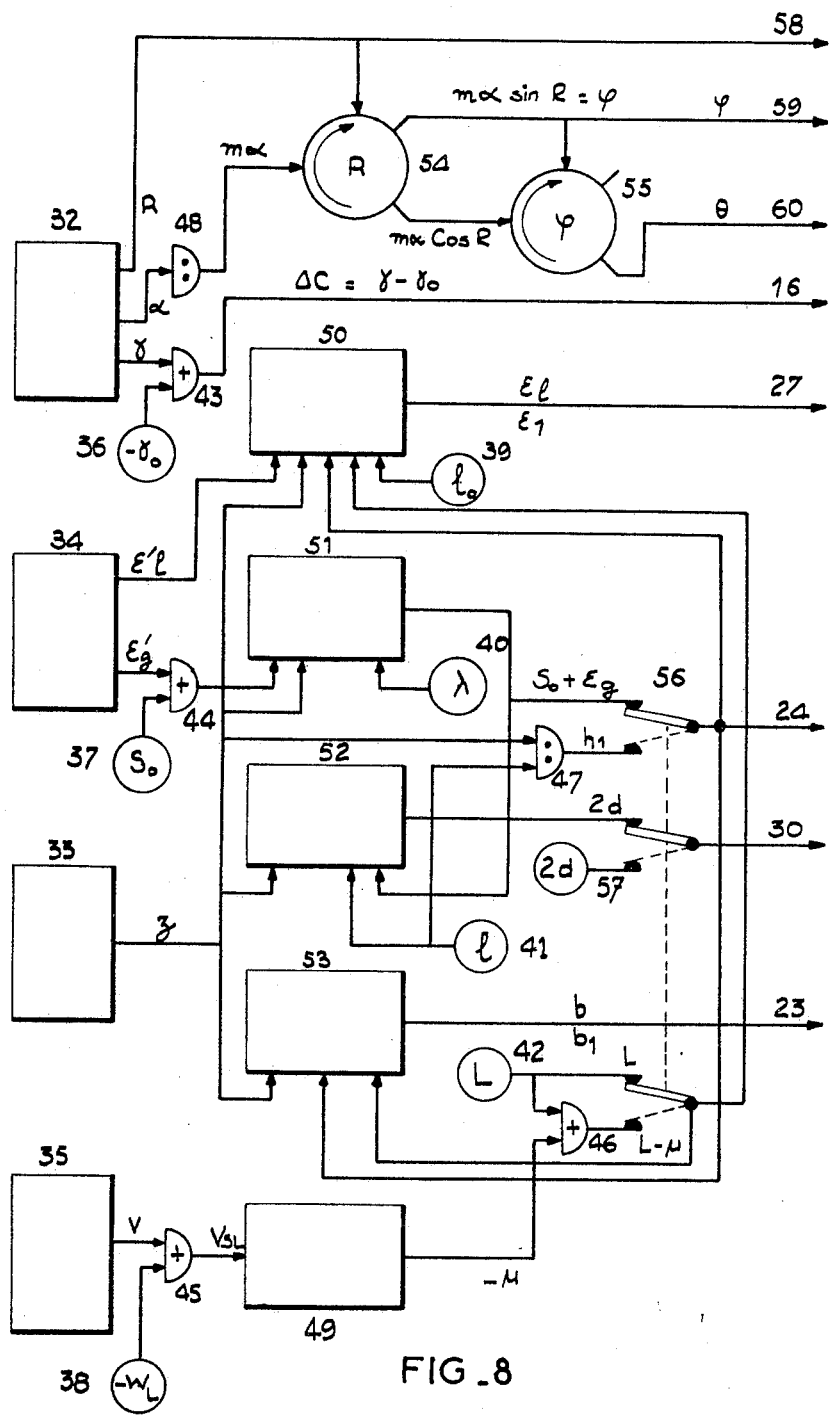
FIG_8

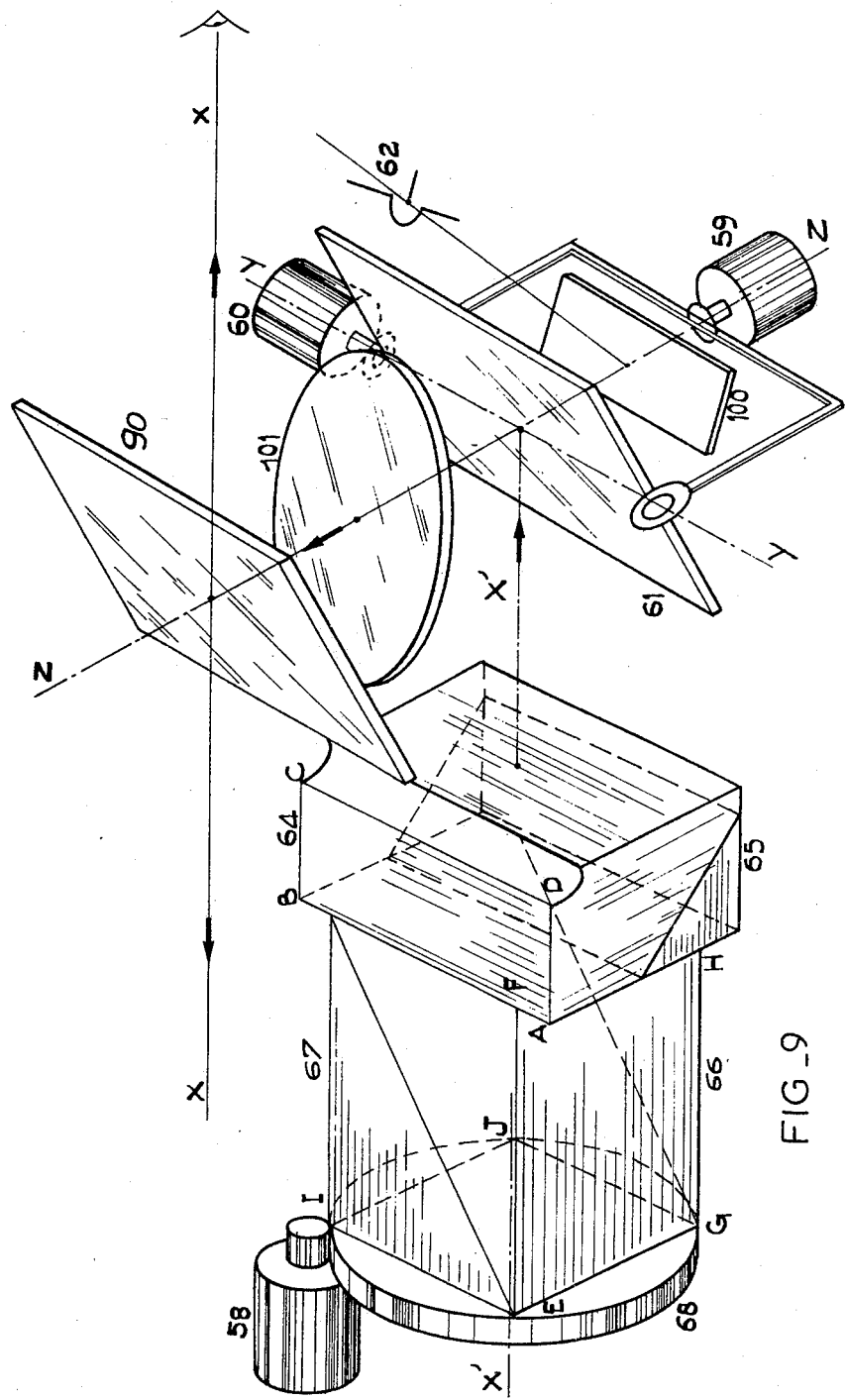
FIG_9

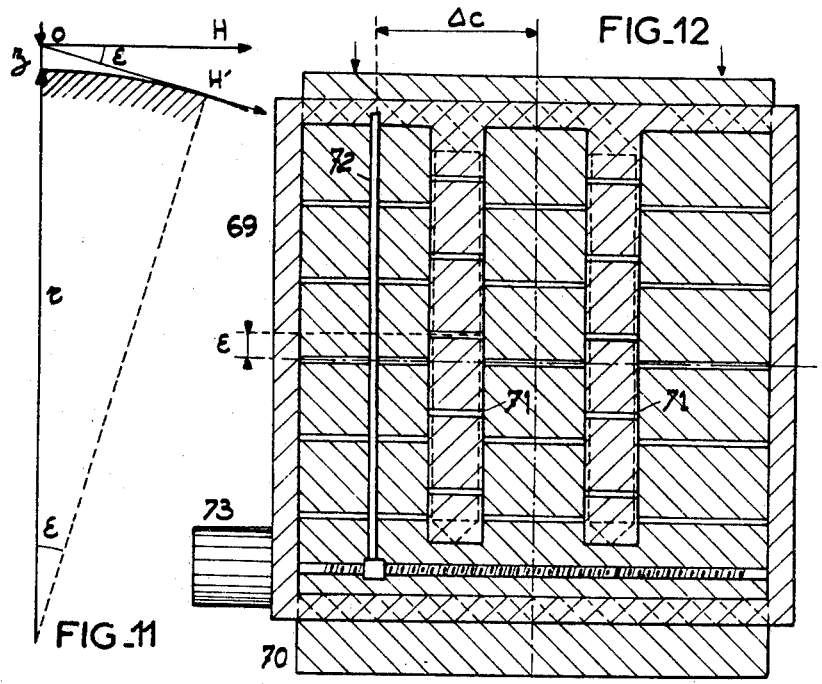
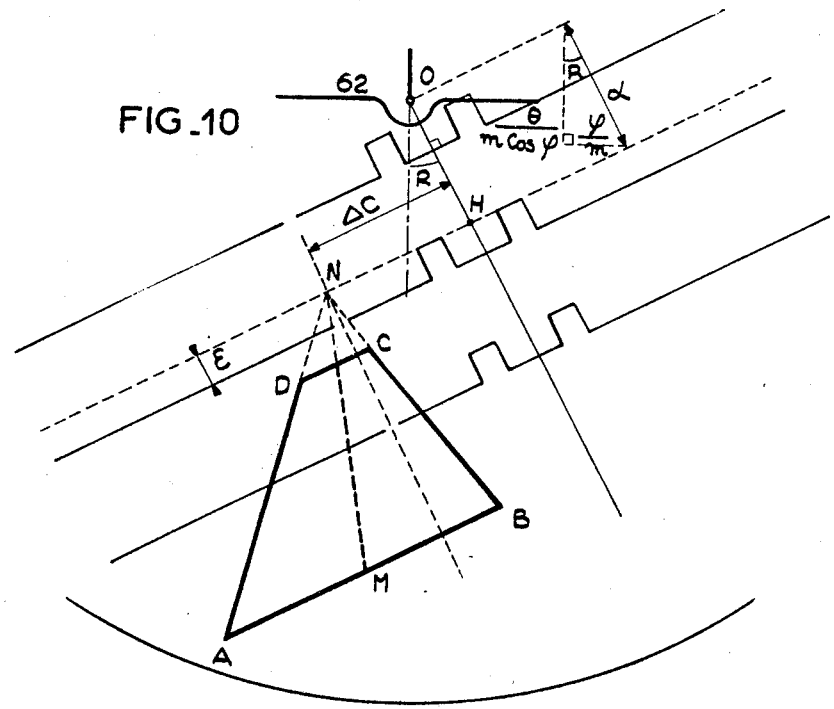

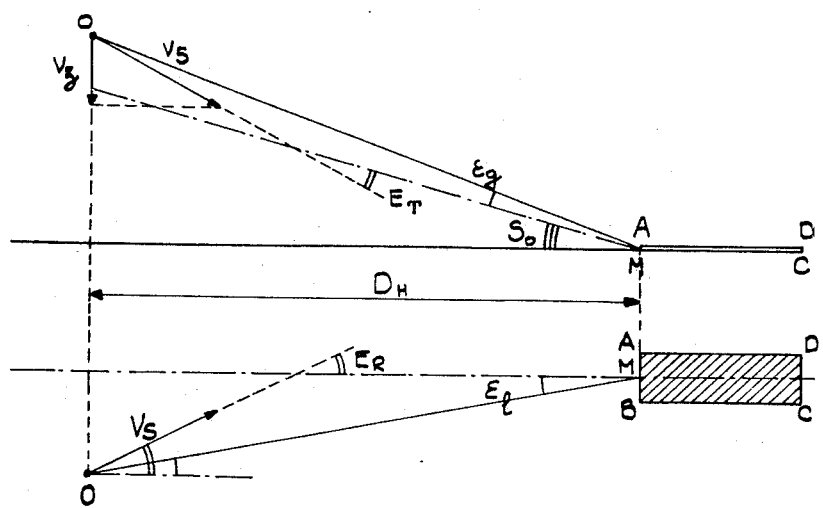
FIG_13
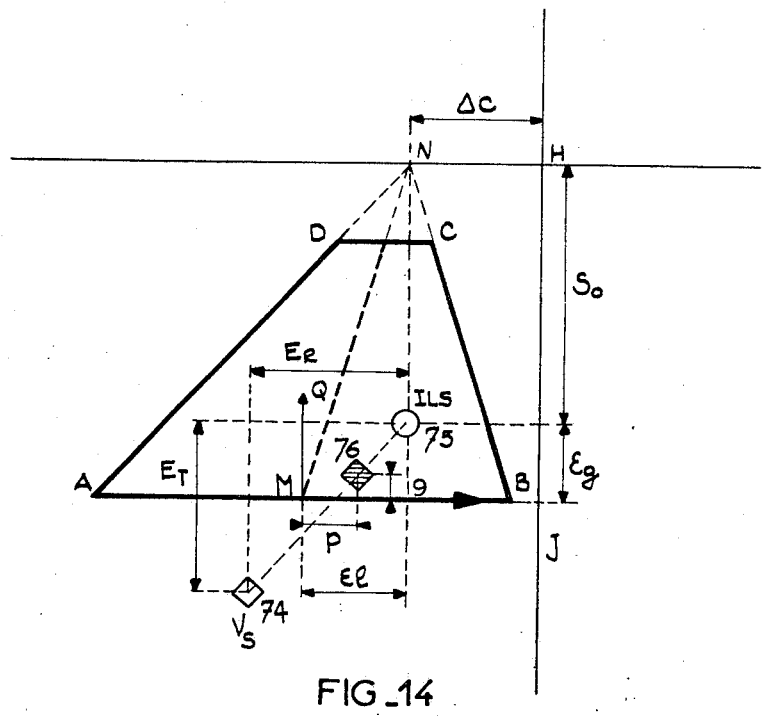
FIG_14

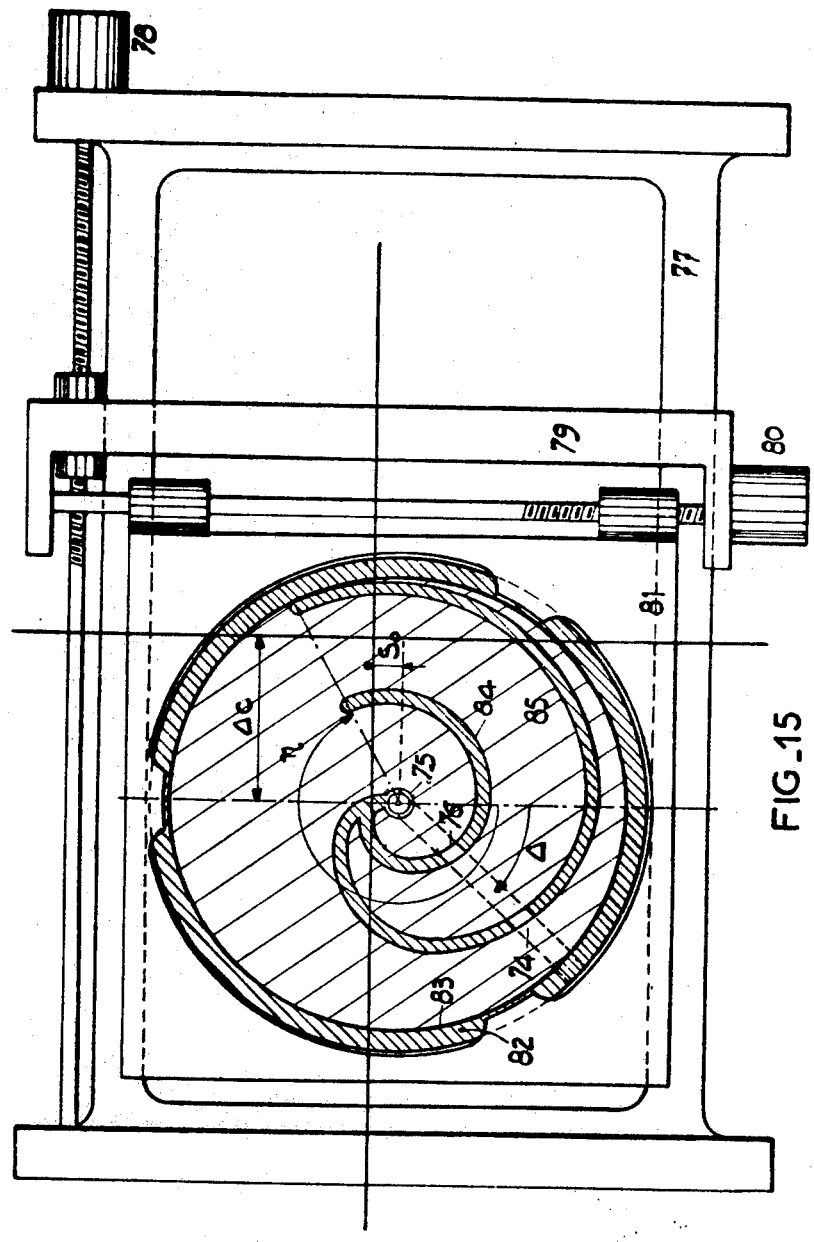

3,486,010
BLIND FLIGHT, APPROACH AND LANDING INSTRUMENTS
Robert Pressiat, Paris, France, assignor to CSF—
 Compagnie Generale de Telegraphie Sans Fil, a
 corporation of France
Filed Oct. 11, 1966, Ser. No. 585,818
Claims priority, application France, Oct. 12, 1965,
34,652
Int. Cl. G06f *15/50;* G06g *7/78*
U.S. Cl. 235—150.26                                                14 Claims

ABSTRACT OF THE DISCLOSURE

A windscreen display of a landing runway is obtained by means of a device including four bars and automatically controlled mechanical and optical means for positioning the bars in order to form a contour representative of the runway, and projecting at optical infinity an image of the bar contour, whose precise location and orientation take into account the location of the aircraft relatively to the runway, the heading error, the angle of bank and the angle of pitch of the aircraft.

---

Under conditions of no visibility, the approach of an aircraft to a landing runway is effected in accordance with piloting instructions supplied by a radio guiding system, such as I.L.S. The pilot has instruments on board which enable him to define the aircraft position relative to an ideal glide path. To this end the pilot has to watch dials which reproduce the positional deviations which he has to correct. The reactions of the pilot to these indications, which are at a reduced scale, must be quicker than what would be necessary if he were made directly aware of the aircraft position relative to the ground. This explains, why instrument flying and landing requires special training and an effort which has to be repeated at every landing.

It is an object of the invention to provide the pilot with visual information data which will enable him to fly and in particular to land without it being necessary for him to watch a number of dials which conventionally provide him with the above data and this without resorting to a cathode ray tube display, the use of which involves well-known inconveniences such as the instability of the picture.

According to the invention there is provided a system including a device for forming the outline of a runway as seen from the cockpit of an aircraft approaching said runway, said device comprising: four bars, automatically controlled mechanical and optical means for positioning the bars for forming a contour representative of the runway, and projecting at optical infinity an image of the bar contour, whose precise location and orientation take into account the location of the aircraft relatively to the runway, the heading error, the angle of bank and the angle of pitch of the aircraft.

For a better understanding of the invention and to show how the same may be carried into effect, reference will be made to the drawings accompanying the following description and in which:

FIGS. 1 and 2 are explanatory diagrams;

FIG. 4 is a perspective view of the optical system associated with the system of FIG. 3;

FIGS. 5, 6 and 7 are explanatory diagrams;

FIG. 8 is a diagram of the control circuits for controlling the system of FIG. 3 and the roll and pitch compensating system;

FIG. 9 is a perspective view of the optical system of the collimator head according to the invention;

FIGS. 10 and 11 are explanatory diagrams;

FIG. 12 shows in elevation the system for providing horizon lines in accordance with the invention;

FIGS. 13 and 14 are explanatory diagrams; and

FIG. 15 shows in elevation the system for providing certain landing data in accordance with the invention.

FIG. 1 shows an aircraft 1 with its cockpit O; the aircraft is in flight along the flight line OH whose direction coincides with the longitudinal axis of the aircraft. The ground, assumed here to be flat, extends to the theoretical horizon NH. A rectangular runway ABCD is also shown, whose median axis MN passes through the centre point M at the run-in end of the runway and the direction of which differs from the direction of the aircraft by an angle $\Delta C$. The runway has a length L and a width $l$. From the approach end of the runway rises an inclined plane 2 defined by the straight lines AB and MP, MP being normal to AB; it forms with the ground a first dihedral angle $S_0$ and with the vertical plane 3 a right angle dihedron having an edge MP. The angular position of the aircraft 1 viewed from point M is defined by the angles $\epsilon_g$ and $\epsilon_1$, which the segment MO forms with the planes 2 and 3 respectively. $\epsilon_1$ is thus the azimuth of the aircraft, relatively to plane 3, while $S_0 + \epsilon_g$ is substantially equal to the elevation of the aircraft as seen from point M.

During the approach phase, these two angles $\epsilon_g$ and $\epsilon_1$ are known to the pilot, as well as the parameters $l$, L and $S_0$, which are characteristic of the ground on which the aircraft is to land. Angles $\epsilon_g$ and $\epsilon_1$ may be derived from the "glide" and "localizer" deviations of the aircraft supplied by I.L.S. The altitude $z$ is also known on board by means of the radio altimeter.

Figure 2:
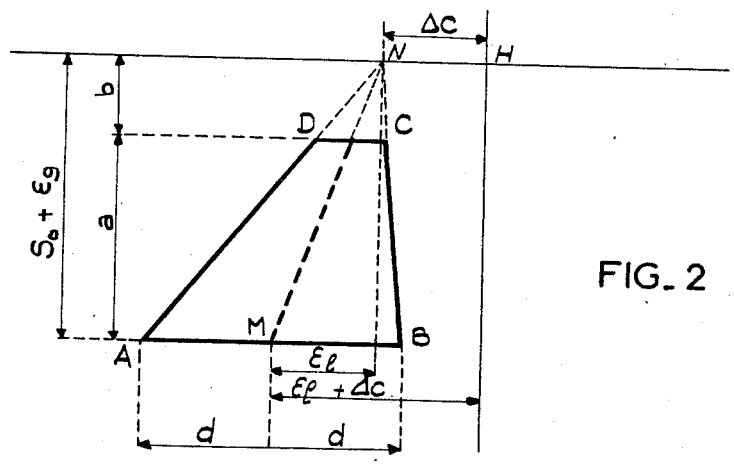

The eye of an observer at O looking in the direction of the longitudinal axis OH of the aircraft 1, embraces a field of vision comprising the horizon NH, the runway ABCD and its axis. The perceived picture is as shown in FIG. 2, showing a runway ABCD of trapezoidal shape located below the line of the theoretical horizon NH. According to the invention, a bar contour is provided whose shape is adjusted to be the same as that of the outline which is obtained through intersecting, intercepted by a plane tangent to the sphere with unit radius and the centre O, those light beams, issuing from the four sides of the runway, which converge on O. In addition, this plane is normal to the axis OH. The distances entered in FIG. 2 are therefore angles expressed in radians which translate in true values the configuration of the ground such as it appears to an observer at O.

In the case shown in FIG. 2, the vanishing point N at which the sides of the runway, as viewed by an observer, would intersect is located on the horizon line NH, to the left of the point H which lies in the aircraft direction of flight at an angular distance $\Delta C$ equal to the heading error. the centre M of the approach end of the runway is shifted to the left by an angle $\epsilon_1$; it is also at a distance $S_0 + \epsilon_g$ below the horizon line, a distance expressed in radians and representing the sum of the inclination $S_0$ and of the angular deviation $\epsilon_g$. Since the aircraft intends to land at an incidence near the ideal glide path MP, the inlet of the runway AB can be traced parallel to the horizon line; its apparent width $2d$ is measured in FIG. 1 by the angle AOB, which may be approximated by the following term:

$$2d \simeq \frac{l}{z}(S_0 + \epsilon_g) \tag{1}$$

The angular distance $b$ which locates the end DC of the runway relative to the horizon may be fixed approximately by a nondimensional equation, such as:

$$b \simeq \frac{(S_0 + \epsilon_g)}{1 + \frac{L}{z}(S_0 + \epsilon_g)} \quad (2)$$

One can therefore represent the trapezium ABCD of FIG. 2, whose parallel sides AB and CD are parallel to the theoretical horizon NH and whose sides intersect the symmetry axis MN, on the same line, at the angular distance ΔC from the point H, centre of the visual filed.

According to the invention, the outline of the trapezium and the straight line joining the centres of the two parallel sides are made visible in the optical field of a collimator system in the form of continuous or broken luminous lines.

FIG. 4 shows four quartz bars 4, 5, 6 and 7 producing a mean rotation of 90° of the plane of polarization of a light beam whose wavelength lies within the visible spectrum and which is transmitted through said bars. These bars define the outline of a deformable trapezium. Two polarization filters 8 and 9, having perpendicular polarization directions are provided on either side of the plane of the trapezium and a light source 10 illuminates the system formed by the assembly of bars and filters. The bar 7 can be masked by a masking plate 11, controlled by an electromagnet 12. The light coming from the source 10 is polarized by the first filter 9 and directed towards the second polarizer 8. By passing through the bars 4, 5, 6 and 7, the light components of the spectrum undergo a rotation with a mean amplitude of 90° so that the light transmitted through the bars can pass through the second polarizer; on the other hand, the light passing around the rules 4, 5, 6 and 7 is not transmitted by the second polarizer 8. The observer on the side of the polarizer 8 sees a trapezoidal outline on a black background. The axis of the runway is made visible by the same means, by a quartz plate glued to a transparent support, not shown in FIG. 4. The support, or one of the input or output faces of the quartz may be provided with strips of opaque material so that the runway axis appears as a dotted line. The side AB of the trapezium may be masked by interposing the masking plate 11, if it is desired to limit the outline of the trapezium to the parts of the runway which remain visible after the entry edge of the runway has been passed by the aircraft.

Figure 3:
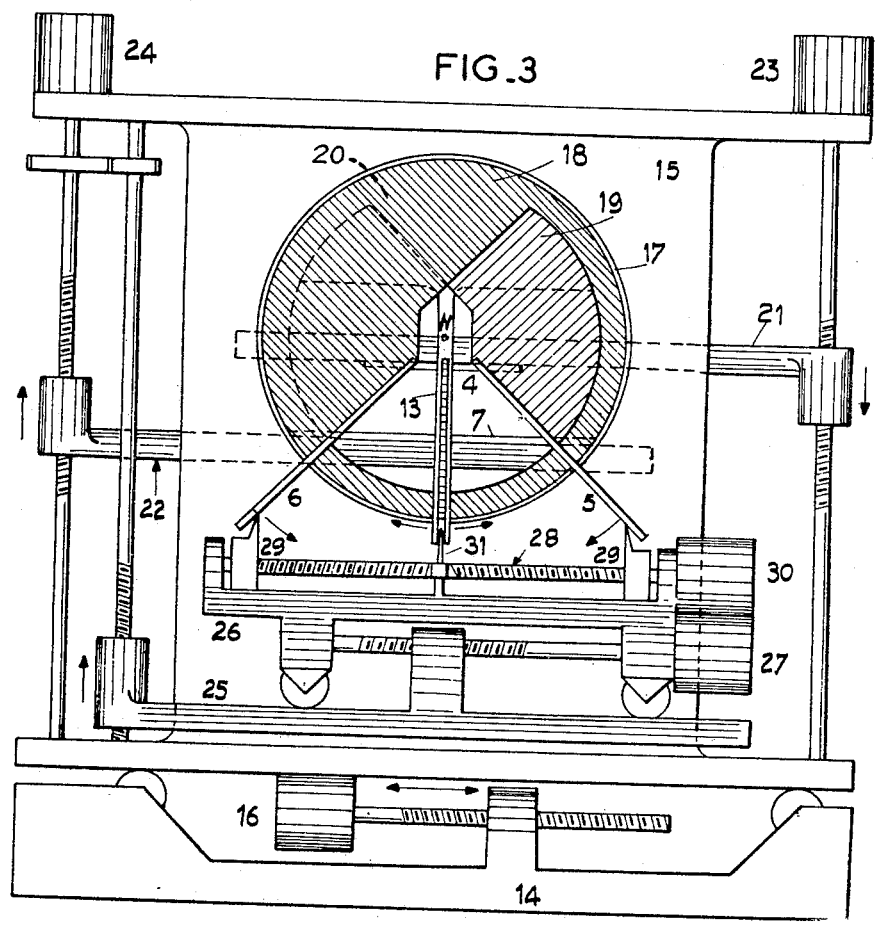
FIG. 3 shows in elevation the system according to the invention for forming a deformable outline of the runway as seen by the pilot at the moment he starts the landing.

FIG. 3 shows the mechanical arrangement capable of simulating the outline of the runway as viewed by the pilot approaching the same, i.e. the runway as shown in FIG. 2. This arrangement provides the reticle formed by bars 4, 5, 6 and 7 of FIG. 4 by suitably displacing these bars, and in accordance with the diagram of FIG. 2. This arrangement comprises a bed 14 on which slides horizontally a frame 15, driven by a servomotor 16. A circular opening 17 having a centre N is provided in the frame 15 to receive a set of three superimposed discs 18, 19 and 20 having cutaway portions as shown in the drawing coaxially therewith. Discs 18, 19, 20 support respectively bars 6, 5 and 13 which may thus be caused to pivot about the point N. The bars 4 and 7 which extend behind the frame 15 are carried, respectively, by moving arms 21 and 22 which are displaced vertically relative to the frame 15 by means of servomotors 23 and 24. The servomotor 24 also controls the vertical movement of a support 25 on which moves horizontally a carriage 26 with a servomotor 27. A leading screw with opposite threads 28 actuated by a servomotor 30 displaces symmetrically two nuts 29 which keep the bars 5 and 6 in spaced relationship. The bars 5 and 6 tend to move towards each other. They are, for example, loaded to this end by suitable springs (not shown). A finger 31, integral with the carriage 26, engages a groove formed in the bar 13 which represents the axis of the runway and thus moves it to the left or right in accordance with the displacement of the carriage 26.

In the initial state, the bars 5, 6 and 13 are in contact and are vertical. The bars 4 and 7 are also in touch at the height of the point N, which then coincides with the optical centre of the collimator.

By acting on the servomotor 16, the frame 15 is displaced horizontally, as shown in the drawing, in order to simulate the heading error ΔC; the carriage 26 is moved by the servomotor 27 so as to assure that the distance, by which the finger 31 is laterally displaced in the horizontal direction, relative to the centre N, is equal to $k \cdot \epsilon_1$ while, by means of the servomotor 24, the finger 31 is vertically displaced by $k \cdot (S_0 + \epsilon_g)$. At this point, the bars 5, 6 and 13 have, all, the direction MN as shown in FIG. 2 and the bar 7, whose position depends on the servomotor 24 is, at this time, below the point N at a distance of $(S_0 + \epsilon_g)$. The servomotor 23 must also be energized in order to lower the bar 4 by a distance equal to the distance $b$ in FIG. 2 and the bars 5 and 6 must be pivoted about point N and thus be separated from the bar 13 by energizing the servomotor 30 which causes the horizontal symmetrical displacements of nuts 29, equal to $k$ times the distance $d$ in FIG. 2. $k$ is a constant depending upon the driving mechanism.

The combination of movements which result in the deformation of the outline of trapezium representing the runway, depends among others on $S_0 + \epsilon_g$ and $\epsilon_1$, which are angular co-ordinates of the aircraft as seen from the centre M of the entry edge of the runway. Yet in fact the "glide" and "localizer" transmitters of the I.L.S., whose signals will be hereinafter assumed to be available, are located as shown in FIG. 5: the glide transmitter G is at the distance λ from the entry edge of the runway, and the localizer transmitter LO, at a distance $l_0$ from the far end of the runway. It is therefore necessary to express $S_0 + \epsilon_g$ and $\epsilon_1$ as respective functions of the known deviations $S_0 + \epsilon'_g$ and $\epsilon'_1$ and the altitude $z$. One obtains then with good approximation the two corrected variables:

$$S_0 + \epsilon_g \simeq \frac{(S_0 + \epsilon^1_g)}{1 - (S_0 + \epsilon^1_g)\frac{\lambda}{z}} \quad (3)$$

and $$\epsilon_1 \simeq \epsilon_1^1 \left[ 1 + (L + l_0) \frac{(S_0 + \epsilon_g)}{z} \right] \quad (4)$$

The invention provides for the masking of the bar 7 at the moment the aircraft is about to pass the entry end of the runway. This masking is effected when the distance $2d$ reaches a maximum angular value $2d_0$ of the order of 0.15 radian. At this moment, the aircraft is still a few metres above the ground and several hundred metres from the entry end of the runway. The masking of the large base of the reticle of the runway indicates to the pilot that he has to start the flattening-out.

FIG. 6 shows in elevation and in top view the landing runway ABCD and the aircraft at the moment the bar 7 is masked. At the precise moment, when the larger of the parallel sides of the trapezium stops becoming larger and escapes from the field of vision, the aircraft is at $O_1$ at a horizontal distance $e$ from the entry end of the runway and follows the path $O_1O_2$. Since the angular distance $2d$ at which the pilot sees the large base of the trapezium no longer increases, the corresponding line is no longer the entry edge of the runway AB, but a segment A'B' which sweeps the runway at the speed of the aircraft. The part of the runway actually represented by the trapezoidal reticle corresponds to the cross-hatched surface A'B'CD. This surface has the width $l$ of the runway and the length $L_1$, corresponding to the length of the runway L, less the distance $\mu$ through which the aircraft has travelled from the moment at which the entry edge of the runway is not longer respresented.

During the whole of the flattening-out phase, the pilot sees in the collimator the open outline A'DCB' and the axis MM'. This image of the reticle is shown in FIG. 7.

Nothing is changed insofar as the heading error, which remains at ΔC is concerned. The large base of the trapezium remains constant, but the deviations $h_1$, $b_1$ and $\epsilon_1$ differ from the deviations $S_0+\epsilon_g$, $b$ and $\epsilon_1$ which characterize the approach phase of the aircraft. Simple geometrical relations connect, from the start of the flattening-out phase (disappearance of the entry edge of the runway), the variables which control the deformation of the reticle of the runway.

$$h_1 \simeq 2d_0 \frac{z}{l} \quad (5)$$

$$b_1 \simeq \frac{h_1}{1+\frac{L_1}{z}h_1} \quad (6)$$

$$\epsilon_1 \simeq \epsilon'_1 \left[ 1 + (L_1+l_0)\frac{h_1}{z} \right] \quad (7)$$

It should be noted that the relations (6) and (7) are substituted, respectively, for the relations (2) and (4) and differ therefrom only by the replacement of L by $L_1$ and of $S_0+\epsilon_g$ by $h_1$; $\epsilon_g$, moreover, does no longer make sense, since the transmitter G, which provides the glide plane according to the I.L.S. system has been passed.

FIG. 8 is a block diagram of the circuit according to the invention, for controlling the reticle representing the outline of the runway. The upper part of the diagram corresponds to the circuits used for controlling the optical arrangement introducing the pitching and rolling effects, which have so far been disregarded. In the left hand column is shown a gyroscopic centre 32 giving the heading $\gamma$, the pitch $\alpha$ and the roll R of the aircraft. A radio-altimeter 33 gives the altitude z. An I.L.S. receiver gives the "glide" deviation $\epsilon'_g$ and the "localizer" deviation $\epsilon'_1$. An aerodynamic device 35 gives the speed of the aircraft, V relative to the wind.

The following information concerning the runway is provided at 36 the orientation $-\gamma_0$ of the runway; at 37 the glide slope $S_0$, at 38 the component, $-W_L$, along the longitudinal direction MN of the runway, of the velocity of the wind; at 39 the distance $l_0$ from the localizer to the remote end of the runway; at 40 the distance λ from the glide transmitter to the entry edge of the runway; at 41 the width of the runway; and at 42 the length L of the runway. Function generators comprise adders 43, 44, 45 and 46, dividers 47 and 48, integrator 49, generators 50, 51, 52 and 53, and sine-cosine potentiometers 54 and 55. Switches 56 permit the switching of the circuits of FIG. 8 so that one mode of deformation of the runway reticle may be substituted for the other when the side AB of the trapezium reaches its maximum $2d_0$. This value $2d_0$ is permanently indicated at 57. The reference numbers on the right of FIG. 8 indicate the output channels which feed the corresponding servomotors of FIGS. 3 and 9.

The circuits of FIG. 8 permit the control of the servomotors of the collimator arrangement according to the invention. The direction $\gamma$, which is supplied by the gyroscopic unit, and the orientation of the runway $-\gamma_0$ are supplied to the adder 43, which delivers a signal ΔC, representing the heading error. The receiver 34 of the I.L.S. supplies the glide deviation $\epsilon'_g$, to which is added in the adder 44 the glide slope $S_0$. The sum $S_0+\epsilon'_g$ is applied to the function generator 51 with the altitude z coming from the altimeter 33 and the distance λ supplied by the indicator 40. The generator 51 operates according to Equation 3 and produces the term $S_0+\epsilon_g$, related to the entry edge of the runway.

The air speed indicator unit 35 gives the speed V of the aircraft relatively to the wind, which speed which is added in the adder 45 to the speed $-W_L$ of the wind to provide the longitudinal speed relative to the ground $V_{SL}$. From the instant $t_0$, when the entry edge of the runway is no longer shown, the signal $V_{SL}$ is integrated by the integrator 49 which supplies the distance $-\mu$, through which the aircraft has flown from the start $t_0$ of the flattening-out phase. The adder 46 therefore supplies the difference $L-\mu$, equal to $L_1$ and representing the length of the shaded zone in FIG. 6. The altimeter 33, the generator 51 and the indicator 41 supply the function generator 52 with the data z, $S_0+\epsilon_g$ and $l$ and, in accordance with Equation 1, this generator supplies the signal $2d$. Moreover, the altimeter 33 and the indicator 41 supply the divider 47 which delivers a signal $h_1$, in accordance with Equation 5, $2d_0$ being a constant inherent in the system. At this stage, all the fixed contacts of the switches 56 are supplied. In the position as shown in FIG. 8, the servomotor 24 receives the signal $S_0+\epsilon_g$ which controls the vertical position of the arms 22 and 25. In the other position, shown in dotted line in FIG. 8, i.e. when the entry edge of the runway has been passed and is no longer shown, the servomotor receives the signal $h_1$.

The servomotor 30 is supplied in the position shown by the generator 52 which controls during the approach phase the pivoting of the non-parallel bars. In the other position, this deviation is maintained at the maximum value $2d_0$. In fact, a stop causes the transfer of the set of contacts 56 from one position to the other, as well as the masking of the side AB of the trapezium, and the start of the integration by the integrator 49.

The servomotor 27 is controlled by the function generator 50 which, in accordance with Equations 4 or 7, as the case may be, delivers the signal $\epsilon_1$ or $\epsilon_1$ which pivots the axis of the represented runway. To this effect, the generator 50 receives in one position of the set of contacts 56 the signals $\epsilon_1$, z, $l_0$, $S_0+\epsilon_g$ and L, coming, respectively, from the I.L.S. receiver 34, the altimeter 35, the indicator 39, the generator 51 and the indicator 42. In the other position, it receives the signals $\epsilon_1$, z, $l_0$ and the signals $h_1$ and $L_1=L-\mu$, coming from the divider 47 and the adder 46, respectively.

The servomotor 23 is controlled by the function generator 53 which, according to Equation 2 or 6, as the case may be, delivers the signal $b$ or $b_1$ which controls the position of the arm 21. To this end, the generator 53 receives in one position of the set of contacts 56, the signals z, $S_0+\epsilon_g$ and L, coming from the altimeter 33, the generator 51 and the indicator 52 respectively, and in the other position, the signals $h_1$ and $L_1=L-\mu$ from the divider 47 and the adder 46, respectively.

The gyroscope unit 32 controls the three servomotors 58, 59 and 60, provided in the optical arrangement of FIG. 9. This arrangement makes it possible as will be shown hereinafter, to take into account the relative displacements of the reticle due to pitching and rolling. In FIG. 8, the spindle of the sine-cosine potentiometer 54 is controlled by the angle of bank R, coming from the gyro unit 32. This potentiometer is supplied by a divider 48 connected to the gyroscopic unit 32, which supplies a part $m$ of the pitch $\alpha$ of the aircraft. The outputs of the potentiometer 54 deliver therefore the signals $m\alpha \sin R$ and $m\alpha \cos R$. The axis of the sine-cosine potentiometer 55 is controlled in turn by the signal $m\alpha \sin R = \varphi$ and this potentiometer is supplied with the signal $m\alpha \cos R$, both signals coming from the potentiometer 54. The output of the potentiometer 55 supplies thus the signal $$\theta = m\alpha \cos R \cos \varphi$$

$m$ is a constant proportionally factor of the arrangement in FIG. 9, $\varphi$ and $\theta$ positioning angles in this arrangement, while $\varphi/m$ and $\theta/m \cos \varphi$ are the angular distances shown in FIG. 20.

While describing FIG. 1 it has been assumed, by way of simplification that the aircraft had a bank angle and a pitch angle equal to zero. Thus the horizon line appeared horizontal to the pilot and cut the visual field in half. In fact, if the aircraft has a bank angle R and a pitch angle $\alpha$, the image seen by the pilot is that of FIG. 10: in the centre O of the field of vision is a reticle 62 simulating the aircraft. Point H which in FIG. 2 coincided with point O has undergone a translation by α, due to the pitching, along the vertical line passing through O. Further, this vertical line and the theoretical horizon have undergone a rotation by —R about point O, due to the rolling. Relatively to the system of axes formed by HN and the normal thereto at H, the contour ABCD is as it was in the diagram of FIG. 2.

An optical collimator, shown in FIG. 9 offers to the pilot at optical infinity the visual superimposition of what he sees outside along the axis of vision XX i.e. the longitudinal axis of the aircraft, and of several reticles amongst which are the fixed reticle 62 and the reticle of the deformable runway analyzed in FIGS. 3 and 4.

FIG. 9 shows an optical superimposition system according to the invention, comprising the prisms 64, 65, 66 and 67. This assembly is mounted on a rotatable platform 68, driven by a servomotor 58. On the right side of the assembly a semi-transparent mirror plate 61 is positioned. It may pivot under the action of the servomotors 59 and 60 about axes ZZ and YY. Above mirror 61, there is a condenser lens 101.

The deformable reticle representing the runway rests on the face ABCD of the prism 64 and the surface, inclined at 45°, which is common to prisms 64 and 65 reflects an image thereof towards the eye of the pilot through a second semi-reflecting plate 61 and the windscreen 90. A luminous horizon pattern—obtained by means of a second deformable reticle to be described hereinafter—is formed on the surface EFGH of the prism 66 and is reflected successively from the surface inclined at 45°, common to the prisms 66 and 67 and from the plate 61. In the same way, by means of a third reticle, luminous markers are formed on the surface EGJI of the prism 67 and are directed to, and then reflected from the plate 61. In addition to the three images of the mobile reticles and of the image of the fixed reticle simulating the aircraft, reflected from the plate 100, the pilot also sees directly through the plate 90 what happens outside. The images of the mobile reticles, and especially the deformable image of the runway are displaced in the field of vision of the pilot due to the rotations R, θ and φ superimposed on the prism block and the plate 61 by the servomotors 58, 60 and 59. The rotation of the prism block about the axis X'X' is equivalent, due to the reflection through the plates 61 and 90, to a pivotal motion of the images about the axis XX. This rotation is a first approximation of the bank angle R given by the gyro unit of the aircraft.

The plate 61 is inclined at 45° in the absence of pitching so as to supply to the pilot pictures which are affected only by the bank angle R. In the presence of pitching, it is necessary to change the setting of the plate so that the reflected images undergo the shift α, representing the pitching of the aircraft. The shift α shown in FIG. 10, is decomposed into its horizontal and vertical components and it can be seen that the plate 61 must be affected by two rotations whose amplitudes are, in first approximation:

about axis ZZ: $\varphi = m\alpha \sin R$ (8)

about axis YY: $\theta = m\alpha \cos \varphi \cos R$ (9)

Due to the rotation R of the prism block and the rotations defined by the Formulae 8 and 9 as a function of the bank angle R and the longitudinal pitching α, the partially transparent screens 61 and 90 supply the pilot with pictures of moving reticles which are superimposed in a satisfactory manner on to the markings on the ground observed simultaneously through the screen 90.

According to the invention, the apparatus comprises a horizon reticle which superimposes on the deformable image of the runway a network of luminous parallel lines, parallel to the theoretical horizon and informs the pilot about the pitching, the rolling R, the heading error and the apparent height of the aircraft above the ground.

FIG. 11 shows in cross-section how, because of the curvature of the earth (earth radius r), there are for an observer O at the altitude z two horizon lines. The theoretical horizon is defined by a vision along the horizontal OH, whilst the real horizon is defined by vision along the tangent OH' to the surface of the earth. Between the theoretical and real horizons, there is an angular difference, which is given by the relation:

$$\epsilon \simeq \sqrt{\frac{2z}{r}} \quad (10)$$

This difference which tends to vanish when the aircraft lands, has been shown in FIG. 10. The line NH representing the theoretical horizon is not visible in the collimator over its entire length; with the exception of two segments symmetrical relative to the axis OH, the line is lowered by an angle ε equal to the above angular difference. The line which is actually seen in the collimator is a line with two crenels, the base of which is the horizon which the pilot really sees. The height of the crenels is gradually reduced until it becomes a continuous line when the aircraft lands. However, the horizon line is interrupted at the distance ΔC from the axis OH so as to give the pilot a marking whereby he can appreciate his heading error ΔC. Also, this line is repeated at equal intervals to form a scale permitting the pilot to evaluate the longitudinal pitching.

FIG. 12 shows a structure for providing the horizon lines as described hereinabove. This structure comprises a frame 69, having two projections 71 extending inwardly of the frame. Projections 71 have transparent, regularly spaced slits. Projections 71 are coextensive with two rectangular openings provided in a plate 70, which is adapted to slide vertically behind the frame 69 and has transparent horizontal slits, spaced apart by the same distance as the slits of extensions 71.

A vertical pointer 72 is mounted for horizontal displacement under the control of a servomotor 73, for example by means of a leadscrew.

The whole of the structure of FIG. 12 is illuminated from behind, so that the slits are projected on the screen as explained above.

The plate 70 is caused to slide vertically as a function of the altitude of the aircraft, so that the distance between homologous slits of the projections 71 and of the plate 70 is equal to the angular displacement ε in accordance with Equation 10.

Simultaneously, the movement of the pointer 72 is controlled by the heading error ΔC. The pilot sees therefore through the collimator screen 90 (FIG. 9) a luminous horizon reticle, observed by transparency on the surface EFGH of the prism 66 of FIG. 9. This reticle is integral with the prism block of FIG. 9, its image undergoes the rotation and translation which represent, respectively, the rolling and the pitching of the aircraft. One obtains finally the image of FIG. 10 which makes it possible to assess the pitch α, the roll R, the heading error and ε. A suitable colour code makes it possible to distinguish the graduation corresponding to the sky and to the ground, the separating line being the real horizon line.

According to the invention, the composite image visible on the collimator screen is further provided with different spots which indicate to the pilot, the point where the aircraft would hit the ground if it were allowed to continue its flight without interference on the part of the pilot, and the action necessary for causing the aircraft to follow the ideal landing glide path. The indications are provided by a so-called "piloting" reticle.

FIG. 13 shows in elevation and in top view the approach of an aircraft O, to the runway ABCD. The velocity of the aircraft relative to the ground is $V_S$; $V_z$ is the vertical component of this velocity and the aircraft is at the distance $D_H$ from the entry edge of the runway. The ideal glide path is the intersection of the glide plane and the localiser plane of the I.L.S. The angle formed by the speed vector $V_S$ with the ideal glide path, as shown in elevation, is the route deviation angle $E_T$ and that formed with the horizontal projection thereof is a trajectory deviation angle $E_R$. The position of the aircraft is defined by the angles $\epsilon_l$ and $\epsilon_g$ with respect to the centre M of the entry end of the runway.

FIG. 14 shows the three luminuos markings 74, 75 and 76 which are added by the piloting reticle to the deformable image of the runway. Since this reticle is on the surface EGJI of the prism 67 in FIG. 9, it is superimposed on the image of the runway.

The position of spot 75, which will be referred to hereinafter as the I.L.S. spot, is defined relative to rectangular axes MB and MQ intersecting at the centre M of the runway entry. It has as coordinates relative to the axes MB, MQ, the deviation $\epsilon_g$ and $\epsilon_l$, the former being, as is known, the elevation deviation of the aircraft, as seen from the middle point of the approach end of the runway, relatively to the slope of the glide plane; its coordinates relative to the axes NH and HJ are therefore $\Delta C$ and $S_0$. Spot 74 in the HN, HJ co-ordinate system to which the trapezium is also related, is the point where the aircraft would touch-down if allowed to follow a trajectory in the extension of $V_S$. Its position is given by the deviations $E_R$ and $E_T$ which are added, respectively to the coordinates of the I.L.S. spot in the MB, MQ coordinate system.

On the straight line joining the markings spots 74 and 75 is provided a marking spot 76, giving the pilot the piloting instructions obtained by interpolation between the transverse deviations $\epsilon_g$ and $\epsilon_l$ of the aircraft and the alignment deviation $E_R$ and $E_T$. The aim of these instructions is to impart to the aircraft a trajectory coinciding with the ideal glide path and it is necessary that the marking 74 should be made to coincide with the marking 75 at the centre M of the entry edge of the runway. According to the invention, this double objective is obtained if the pilot follows the reference marking 76 which divides the line joining the marking 74 and 75 with a constant ratio. The coordinates $p$ and $q$ of marking 76 indicate to the pilot the orders he must carry out in order to assure that the aircraft may reach asymptotically the ideal glide path.

FIG. 15 shows in elevation the structure producing the markings 74, 75 and 76. It comprises a fixed frame 77. A carriage 79, carrying a plate 81, parallel to the frame is adapted for being displaced in front of the frame 77 by means of a servomotor 78. The plate 81 may be moved along the carriage by means of a servomotor 80. The plate 81 has a circular opening. In this opening a disc 82 is so mounted that it can be rotated therein. A hole 75 is formed in the centre of the disc 82 and a radial slit extends from the hole 75 to the periphery of the disc 82. A further disc 83 superimposed on the disc 82, is also mounted for rotation within the same opening. The disc 83 has two spiral slots in the form of Archimedean spirals 84 and 85. Thus light is allowed to cross the plate 81 only where the slits cross each other.

The servomotors 78 and 80 displace the plate 81 as a function of the heading error $\Delta C$, and the slope $S_0$ of the glide plane.

The radial slot of the disc 82 is inclined at the angle $\Delta$ which is linked with the deviations $E_R$ and $E_T$ by the formula:

$$\Delta = \arc \tan \frac{E_R}{E_T}$$

The Archimedean spiral 85 is caused to rotate through an angle $\eta$ as a function of $E_R$ and $E_T$, so that the distance between the markings 74 and 75 is equal to $\sqrt{E_R^2 + E_T^2}$. The spiral 84 is such that the ratio of the distances from the marking 76 to the markings 74 and 75 should have a value K which depends on the nature of the aircraft.

Of course the invention is not limited to the embodiments described and shown which were given solely by way of example.

What is claimed is:
1. A system adapted to supply visual information data to the pilot of an aircraft, said system comprising a device for forming the outline of a runway, having longitudinal edges, an approach end and a far end, as seen from the cockpit of an aircraft approaching said runway, said device comprising:

a first mechanical structure comprising a rotation centre fixed relative to said first structure, and representative of the vanishing point of the longitudinal edges of said runway; first and second bars, rotatably mounted about said rotation centre; third and fourth bars, parallel with each other, and slidingly mounted in said first structure along a direction perpendicular to the direction of said parallel bars; the four points of intersection of said first and second bars with said third and fourth bars defining a trapezium formed by respective portions of said bars;

and first control means including means for: adjusting, in said first structure, the distance from said fourth bar to said rotation centre as a function of a first angle substantially equal to the elevation of said aircraft as seen from the middle point of the approach end of said runway; adjusting the distance of said third bar from said rotation centre as a function of said first angle, of the altitude of said aircraft, and of the length of said runway; and adjusting the angular positions of said first and second bars as a function of the aperture angle of the approach end of said runway as seen from said cockpit, and of the azimuth, relatively to the vertical plane longitudinally bisecting said runway, of said aircraft as seen from said middle point.

2. A system as claimed in claim 1, further comprising a second mechanical structure relatively to which said first mechanical structure is slidingly mounted along a direction parallel to that of said parallel bars, said centre of rotation describing, in said sliding motion, a portion of a straight line passing through a fixed point in said second structure, and second control means for controlling the position of said first structure relatively to said second structure to adjust the distance from said rotation center to said fixed point in said second structure as a function of the heading error of said aircraft relatively to said vertical plane.

3. A device as claimed in claim 1, more particularly adapted for cooperation with an ILS system including a glide transmitter and a localizer, wherein said first control means include a first function generator for deriving said first angle from the slope of the glide plane, the ILS glide transmitter signal, the altitude of said aircraft and the distance from said glide transmitter to said approach end of said runway; a second function generator for deriving said azimuth from the ILS localizer signal, the altitude of said aircraft, the output signal of said first function generator, the length of said runway, and the distance from said localizer to the far end of said runway; and a third function generator for deriving said aperture angle from the altitude of said aircraft, the width of said runway and the output signal of said first function generator.

4. A system as claimed in claim 1, wherein said device is further adapted to form, by means of said first, second and third bars, an outline of said runway as seen from the cockpit of said aircraft when said approach end is no longer visible from said cockpit, and wherein said first control means further comprise subsidiary means for adjusting the distance from said third bar to said rotation centre as a function of the altitude of said aircraft, the width of said runway and the length of the remaining visible portion of said runway as seen from said cockpit; and means for adjusting the angular positions of said first and second bars as a function of a constant representative of the maximum value reached by said aperture angle, said localizer signal, said length of said remaining visible portion, the distance from said localizer to said far end of the runway, and the width of said runway.

5. A system as claimed in claim 2, wherein said device further comprises optical means for giving at infinity, in the direction of the longitudinal axis of the aircraft, an image of said trapezium substantially coinciding with the contour of said runway as seen from said cockpit, at least for zero values of the bank angle and pitch angle of said aircraft.

6. A system as claimed in claim 1, wherein said bars are of a substance having a rotary effect on the polarization of the light passing therethrough, and wherein said device further comprises: two polarizers having crossed polarization directions, said first structure being inserted between said polarizers; and means for illuminating one of said polarizers.

7. A system as claimed in claim 4, wherein said device includes further means for masking said fourth bar.

8. A system as claimed in claim 5, further comprising means for rotating said second structure as a function of the angle of bank of said aircraft so that, in said image at infinity, the direction of said parallel bars makes with the horizontal direction an angle equal and opposite to the angle of bank of said aircraft.

9. A system as claimed in claim 8, wherein said optical means include reflecting means for forming an intermediate image of said trapezium, further means for providing an infinity in the direction of the longitudinal axis of said aircraft an image of said intermediate image, and first and second means for pivoting said reflecting means respectively about two axes normal to each other; and wherein said device further comprises means for controlling said first pivoting means as a function of $m \alpha \sin R$, $m$ being a constant, $\alpha$ being the pitch angle and $R$ the angle of bank, and means for controlling said second pivoting means as a function of $m.\alpha.\cos (m \alpha \sin R).\cos R$.

10. A system as claimed in claim 9, said system further comprising a second device for forming a representation of horizon lines, said second device comprising: a frame, a movable plate; means for translating said plate relative to said frame along a predetermined direction of said frame, said plate having at least one elongated aperture parallel to said predetermined direction and a first plurality of slits perpendicular to said predetermined direction; at least one member extending within said frame and integral therewith, said member having a second plurality of slits perpendicular to said predetermined direction, said member being coextensive with said aperture; said slits of said first plurality being respectively aligned with said slits of said second plurality in a rest position of said plate with respect to said frame; and means for controlling said translating means as a function of the altitude of the aircraft above the ground.

11. A system as claimed in claim 10, wherein said second device further comprises a pointer intersecting said slits and means for translating said pointer along said slits as a function of the heading error of the aircraft.

12. A system as claimed in claim 10, wherein said second device comprises means for mechanically tying said frame to said second structure and optical means, combined with said optical means of said first device, for superimposing an image of said slits on an image of said trapezium, to form a composite image which is reflected by said reflecting means to form said intermediate image of said trapezium as a part of the reflected composite image.

13. A system as claimed in claim 12, further comprising means for superimposing on said image at infinity a further fixed image symbolizing the aircraft.

14. A system as claimed in claim 5, further comprising means for superimposing on said image at infinity of said trapezium: a first luminous spot at the image point of the point of intersection of the straight line carrying the velocity vector of said aircraft with the plane of said runway; a second luminous spot whose position is defined by the elevation deviation, relatively to said guide plane, of said aircraft as seen from said middle point, and by said azimuth; and a third luminous spot dividing in a predetermined ratio the straight line portion comprised between said first and second luminous spots.

References Cited

UNITED STATES PATENTS

| 3,205,497 | 9/1965 | Swadell | 343—108 |
| 3,242,493 | 3/1966 | Westerback | 343—108 |
| 3,339,203 | 8/1967 | Curry et al. | 343—108 |
| 3,345,632 | 10/1967 | Rover | 343—108 |
| 3,355,733 | 11/1967 | Mitchell et al. | 235—150.22 X |

MALCOLM A. MORRISON, Primary Examiner

ROBERT W. WEIG, Assistant Examiner

U.S. Cl. X.R.

235—150.22; 343—7, 108